United States Patent

Schaffer et al.

[11] Patent Number: 5,458,264
[45] Date of Patent: Oct. 17, 1995

[54] DEVICE FOR EMPTYING POWDERY SUBSTANCES FROM CONTAINERS

[75] Inventors: Roland Schaffer, Linsengericht; Herbert Riemenschneider, Gelnhausen, both of Germany

[73] Assignee: Degussa Aktiengesellschaft, Frankfurt am Main, Germany

[21] Appl. No.: 249,473

[22] Filed: May 26, 1994

[30] Foreign Application Priority Data

Jun. 2, 1993 [DE] Germany ............... 43 18 344.1

[51] Int. Cl.$^6$ ............... B67D 5/64
[52] U.S. Cl. ............ 222/637; 222/561; 222/90; 406/143
[58] Field of Search ............ 222/82, 83, 90, 222/630, 637, 561; 239/272; 406/141, 142, 143, 130

[56] References Cited

U.S. PATENT DOCUMENTS 1,357,663  11/1920  Von Porat ............... 406/143
2,585,801  2/1952   Lieuwen ................ 222/90
3,162,332  12/1964  Hayim .................. 222/630
4,349,054  9/1982   Chipman et al. ......... 141/1
4,538,941  9/1985   Thorne ................. 406/143
4,812,086  3/1989   Kopernicky ............. 406/153
5,356,036  10/1994  Garnett ................ 222/630 X

FOREIGN PATENT DOCUMENTS 419531    10/1925  Germany.
8032676   5/1981   Germany.
033832    8/1981   Germany.
3805531   3/1989   Germany.
8231899   8/1989   Germany.
1341195   12/1973  United Kingdom.

Primary Examiner—Gregory L. Huson
Attorney, Agent, or Firm—Beveridge, DeGrandi, Weilacher & Young

[57] ABSTRACT

A tube device for emptying powdery substance from a container in which an air connection pipe is arranged. The air exit opening of the air connection pipe is located coaxially to the tube in the direction of the interior of the tube. The opening of the tube is cut open on a slant to form an angle of less than 90° with the horizontal axis of the pipe.

4 Claims, 2 Drawing Sheets

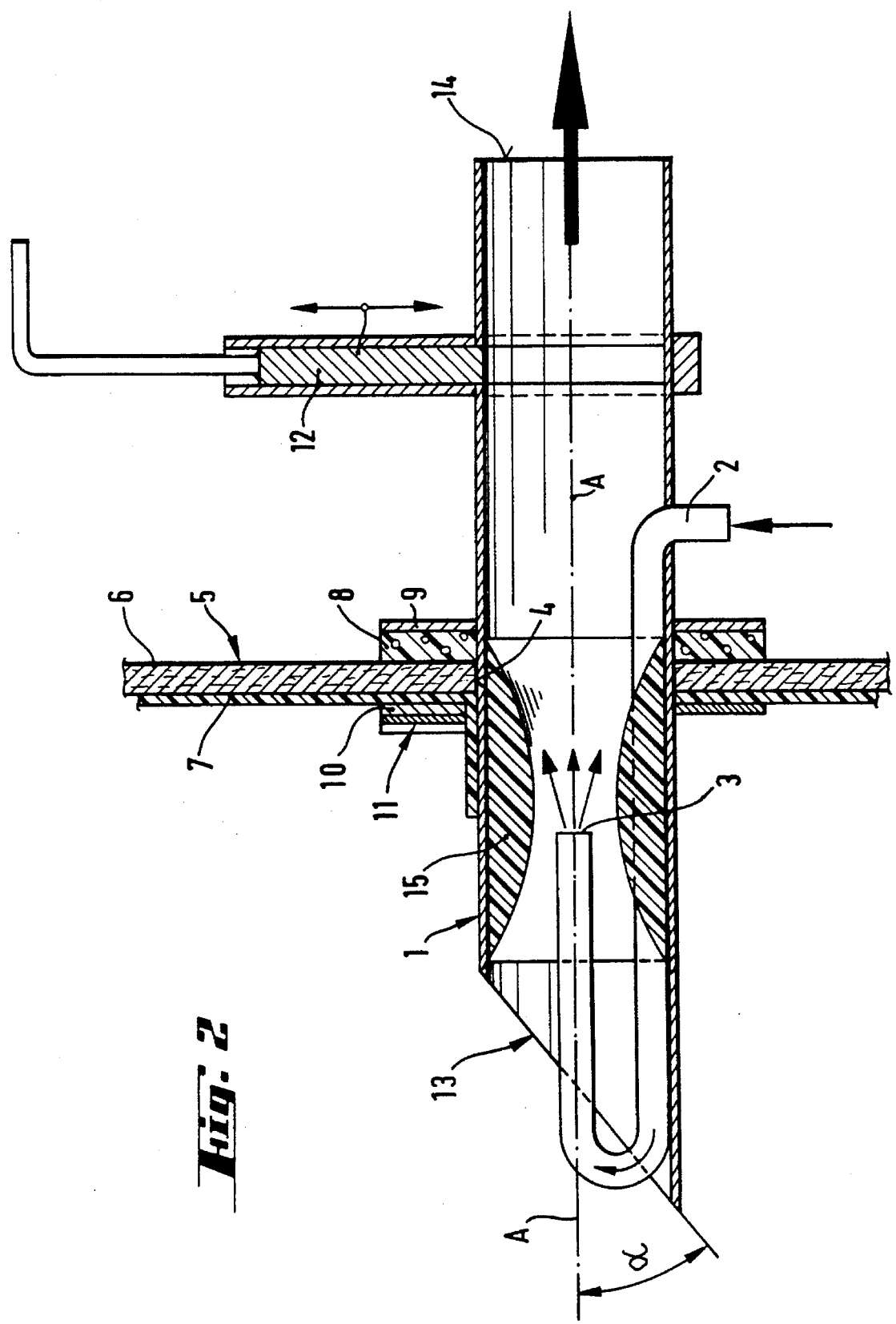

DEVICE FOR EMPTYING POWDERY SUBSTANCES FROM CONTAINERS

INTRODUCTION AND BACKGROUND

The present invention relates to a device for emptying powdery substances from containers.

The transporting of powdery substances such as, for example, synthetic silicas, carbon blacks, dyeing pigments, perborates, percarbonates and the like in non-returnable containers with a volume of two cubic meters is known. These containers generally are formed of a folded box for the side walls and of two slip or telescoping boxes as bottom and top cover with the dimensions 1170 mm×960 mm×1700 mm and are placed on a suitable wooden pallet dimensioned to accommodate the box. The powdery substance itself is protected against moisture by an adjustable polyethylene bag in the interior of the carton. The polyethylene bag is closed by a simple wire loop. The two cubic meter container contains as a typical material 100 kg pyrogenically produced silica.

The emptying of the conventional container, such as the two cubic meter container takes place in a known manner from the top. This operation can employ a suction nozzle, such as is known in the art (EP-A 0 033 832), if a finely divided powdery substance such as pyrogenic silica is being transported in the container. The emptying operation must take place from the top because highly dispersed substances such as e.g. pyrogenically produced silica, form bridges and do not exhibit a continuous flow. After emptying of its contents, the container itself is conveyed to another location for appropriate usage.

As a result of the recently decreed packaging regulation in Europe, there is now the requirement of taking back the two cubic meter container and reusing it for the same powdery substance. Efforts in this country, too, are being made to recycle as much as possible. However, the use as returnable containers necessitates an emptying of the powdery contents via an opening located at the bottom or in the vicinity of the bottom. Emptying by means of the suction nozzle as is known from document EP-A 0 033 832 is then no longer possible because powdery substances such as e.g. pyrogenically produced silica exhibit a poor flow behavior.

There is thus a need to develop a device for emptying powdery substances with which an emptying from containers is possible at the bottom or in the vicinity of the bottom.

SUMMARY OF THE INVENTION

An object of the invention is to provide a way to overcome the problem of emptying powdery substances from the bottom of containers.

In achieving this and other objects one feature of the invention resides in a device for emptying powdery substances from containers which is characterized in that an air connection 2 is arranged in such a manner in a tube 1 that the air exit opening 3 is located coaxially to the tube 1 in the direction of the interior of the tube and that the opening 13 of the tube 1 located closest to the air exit opening 3 of the air connection 2 exhibits an edge whose plane surrounded by the edge forms an angle of less than 90° with the axis of the tube 1.

In one embodiment of the invention the air exit opening 3 can be arranged within a cross-sectional constriction of tube 1.

The device of the invention can be used in particular to empty powdery substances with a low bulk weight such as e.g. synthetically produced silicas, carbon blacks, dyeing pigments, perborates, percarbonates or similar substances from containers. The device of the invention is especially suited for emptying pyrogenically produced silica.

BRIEF DESCRIPTION OF DRAWINGS

The invention will be further understood with reference to the drawings, wherein:

FIG. 2 is a partial cross-sectional view of another embodiment of the apparatus of the invention.

DETAILED DESCRIPTION OF THE INVENTION

Figure 1:
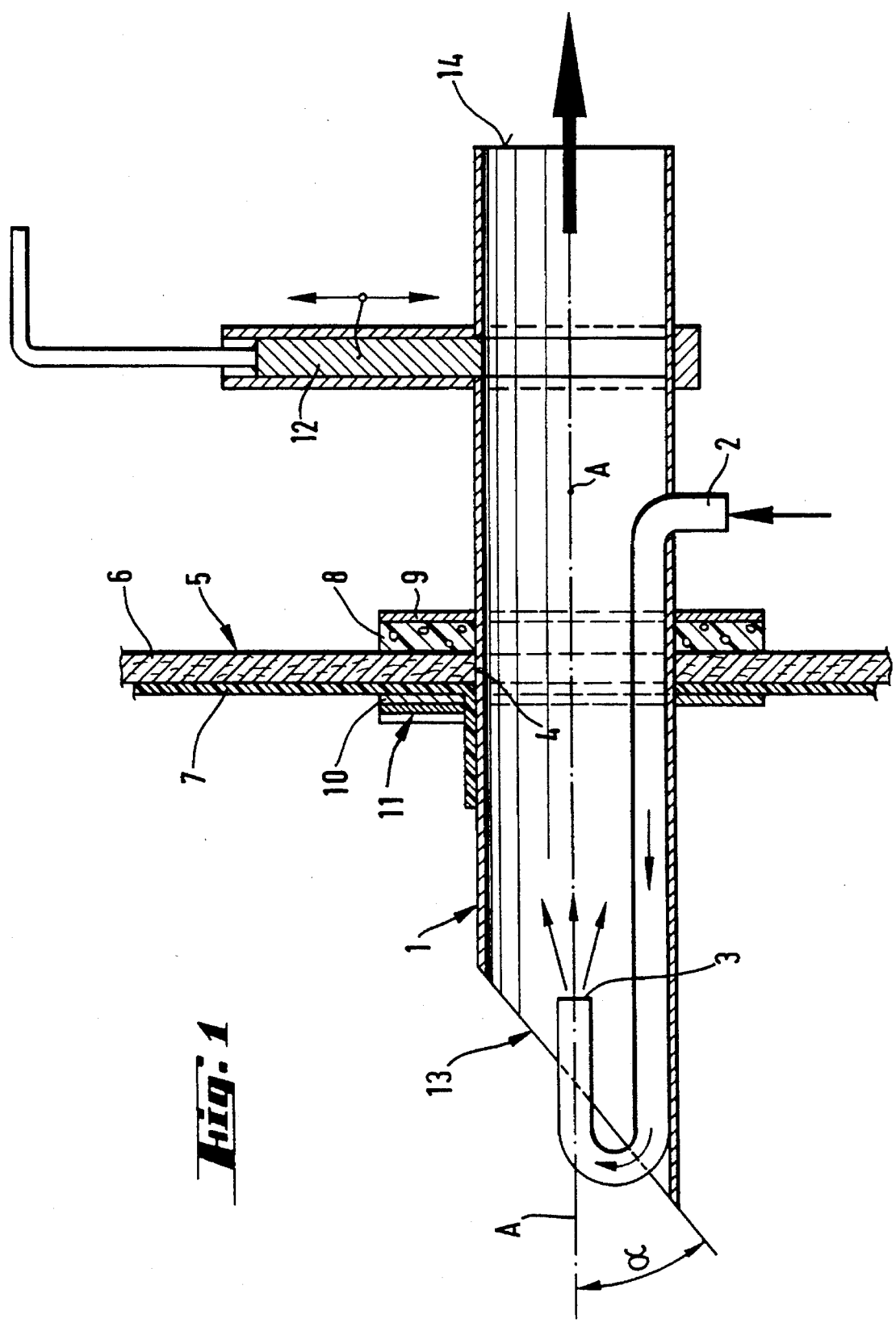
FIG. 1 is a partial cross-sectional view of the apparatus of the invention.

According to FIG. 1 the device in accordance with the invention consists of tube 1 in which air connection 2 is arranged in such a manner that exit opening 3 of air connection 2 is located coaxially to tube 1 in the direction of the interior of tube 1. Tube 1 is thrust into opening 4 of the wall of container 5, which wall consists of a cardboard or kraft carton 6 to which is adhered polyethylene film 7. In order to avoid problems with dust, tube 1 is provided with a foam rubber or gasket sleeve 8 outside of the container. Tube 1 can be closed with slide or closing gate 12 so that no more transport takes place. Any suitable valve or gate means can be used. Compressed air which is conducted at the exit opening into the interior of tube 1 is supplied via air connection 2. Tube 1 is cut off at an angle of 45° at end 13, that is, the plane surrounded by the edge of end 13 forms an angle of 45° with the axis of tube 1. The obliquely slanted, open side is directed upward. The powdery substance, e.g. pyrogenically produced silica, which slides under the influence of gravity in the direction of arrow A is transported by the current of compressed air under oblique opening 13 into the interior of tube 1 and, moreover, through end 14 into the catch container provided (not shown). Foam rubber sleeve 8 is pressed by ring 9, which is fastened on the jacket of tube 1, against container wall 5. At the same time tube 1 is held fast by a second ring 10 from the inside on container wall 5. Ring 10 is open at position 11 and the ends are laterally shifted. As a result, ring 10 can function as a bayonet catch.

According to FIG. 2 the cross-sectional flow of tube 1 is constricted by means of polypropylene or other polymeric insert 2 in the form of a Venturi nozzle. This enables the flow rate to be increased and therewith the transport rate to be increased.

Thus, applicants invention in one aspect relates to a fitting to be inserted into a container for finely divided, powdery substances. The container is typically a cardboard or kraft paper box but can be of any suitable construction. In general the inside of the container is lined with a polyolefin film by adhesion through adhesive means or heating sealing to the interior wall of the container. Alternatively, the polyolefin bag can be fitted inside the box. The fitting is a circular tube or tubular conduit passing through the wall of the container and is fitted to the wall by convenient gasket means of any suitable type although foam rubber is preferred.

On the exterior of the container, the fitting has attached to it suitable gate or closure means to control emptying of the contents and permitting opening and closing of the container to catching or storage means of any suitable type.

The tube has arranged in its interior, air connection pipe means for delivery of a flow or stream of compressed air into the center of the tube parallel and coincident with the central axis of the tube. The end of the air pipe that is inserted into the interior of the container is a U-shaped so as to direct the air stream towards the exterior of the container and thereby assist in blowing the finely divided contents of the container into the packaging or storage means to empty the container.

In another aspect, the invention resides in a container box for powdery substances fitted with the emptying tube device as described herein. The novel container of the present invention can be emptied efficiently and effectively so as to enable its reuse and thereby meet environmental concerns.

Further various and modifications of the foregoing will be apparent to those skilled in the art and are intended to be encompassed by the claims.

German priority application P 43 18 344.1 is relied on and incorporated herein by reference.

We claim:

1. A device for emptying powdery substances from a container therefor, the device comprising a tubular conduit containing proximate one end thereof a gate or valve member, a air connection pipe means for delivery of an stream of air being positioned inside said tubular conduit and parallel to the main axis thereof, said pipe means having one end thereof adapted to connect with a source of compressed air outside of said tubular conduit through a wall thereof, the opposite end of said pipe means being U-shaped with the opening of said pipe means being oriented towards said gate member, the other end of said tubular conduit being open and having a slanted opening such that the end edge of the tubular conduit, the plane of which surrounds the end edge of the tubular conduit end forms an angle of less than 90° with the axis of the tubular conduit.

2. The device for emptying powdery substances according to claim 1, wherein said air connection pipe means is arranged in such a manner in said tubular conduit that the air exit opening is located coaxially to the tubular conduit in the direction of the interior of the tube and that the opening of the tubular conduit located closest to the air exit opening of the air connection pipe means exhibits an edge whose plane surrounded by the edge forms an angle of less than 90° with the axis of the tube.

3. The device according to claim 2, wherein the air exit opening is arranged within a cross-sectional constriction of the tubular member.

4. A container box for powdery substances fitted with the device of claim 1.

* * * * *